(12) United States Patent  (10) Patent No.: US 6,527,339 B2
Voris                      (45) Date of Patent:     Mar. 4, 2003

(54) ADJUSTABLE PILLOW FOR HIGH BACK JUVENILE VEHICLE SEAT

(75) Inventor: Larry Voris, Nashville, IN (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 09/799,986

(22) Filed: Mar. 6, 2001

(65) Prior Publication Data

US 2001/0022457 A1 Sep. 20, 2001

Related U.S. Application Data

(60) Provisional application No. 60/189,644, filed on Mar. 15, 2000.

(51) Int. Cl.[7] ................................................ A47C 31/00
(52) U.S. Cl. .............................. 297/219.12; 297/284.7; 297/230.14
(58) Field of Search ........................... 297/219.12, 397, 297/284.5, 284.7, 230.14

(56) References Cited

U.S. PATENT DOCUMENTS

| 1,228,771 | A | * | 6/1917 | Hanger | 297/284.7 X |
| 2,060,298 | A | * | 11/1936 | Gailey | 297/284.5 |
| 2,307,331 | A | * | 1/1943 | Parker, Jr. | 297/284.7 X |
| 5,335,965 | A | * | 8/1994 | Sessni | 297/284.5 |
| 5,345,633 | A | * | 9/1994 | Harnish | 297/397 |
| 6,116,691 | A | * | 9/2000 | Reece | 297/397 |

* cited by examiner

Primary Examiner—Anthony D. Barfield
(74) Attorney, Agent, or Firm—Barnes & Thornburg

(57) ABSTRACT

An adjustable pillow system is provided for use with a juvenile vehicle seat. The pillow system includes a vertical slide strap adapted to be coupled to the juvenile vehicle seat and a pillow coupled to the vertical slide strap to slide up and down on the strap.

4 Claims, 4 Drawing Sheets

ADJUSTABLE PILLOW FOR HIGH BACK JUVENILE VEHICLE SEAT

This application claims priority under U.S.C. § 119(e) to U.S. Provisional Application No. 60/189,644 filed Mar. 15, 2000, which is expressly incorporated by reference herein.

BACKGROUND AND SUMMARY OF THE INVENTION

The present invention relates to a juvenile vehicle seat, and particularly to a pillow coupled to the vehicle seat. More particularly, the present invention relates to a pillow coupled to a vehicle seat cover portion of the vehicle seat and provided to support a juvenile's head thereupon.

According to the present invention, an adjustable pillow system is provided for use with a juvenile vehicle seat. The system includes a vertical slide strap coupled to the seat and a pillow slidably coupled to the vertical slide strap. The pillow includes a body having a front side and a back side positioned to lie adjacent the seat and a horizontal positioning strap coupled to the rear side of the body. The pillow is movable in a generally vertical direction along the vertical slide strap between a lowest position and a highest position.

The vertical slide strap of the present invention further includes a top end coupled to the seat, an opposite bottom end, and a middle portion. The back side of the body of the pillow and a portion of the horizontal positioning strap cooperate to form a passageway for receiving the middle portion of the vertical slide strap therethrough.

In preferred embodiments, the body of the pillow is trapezoidal having a top, narrow end and a bottom, wide end. The horizontal positioning strap of the present invention is coupled to the top, narrow end of the body. The body of the pillow is made of a textured material to cause the pillow to normally remain stationary relative to the juvenile vehicle seat.

In further preferred embodiments, a vehicle seat cover is coupled to the juvenile vehicle seat. The cover includes a slot and the bottom end of the vertical slide strap is received through the slot. The cover includes a front side adjacent the pillow and a back side. The bottom end of the vertical slide strap includes a stitch-fold portion received through the slot so that the stitch-fold portion is positioned to lie adjacent to the back side of the cover and the middle portion of the vertical slide strap is positioned to lie adjacent the front side of the cover.

In further preferred embodiments, the horizontal positioning strap and the vertical slide strap are each made from a corrugated material. The engagement of the corrugated material of the horizontal positioning strap and the vertical slide strap causes the pillow to normally remain stationary relative to the cover.

In yet further preferred embodiments, the system includes another vertical slide strap received through the passageway formed by the rear side of the body of the pillow and the horizontal positioning strap coupled to the body of the pillow.

Features of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figures 1, 2:
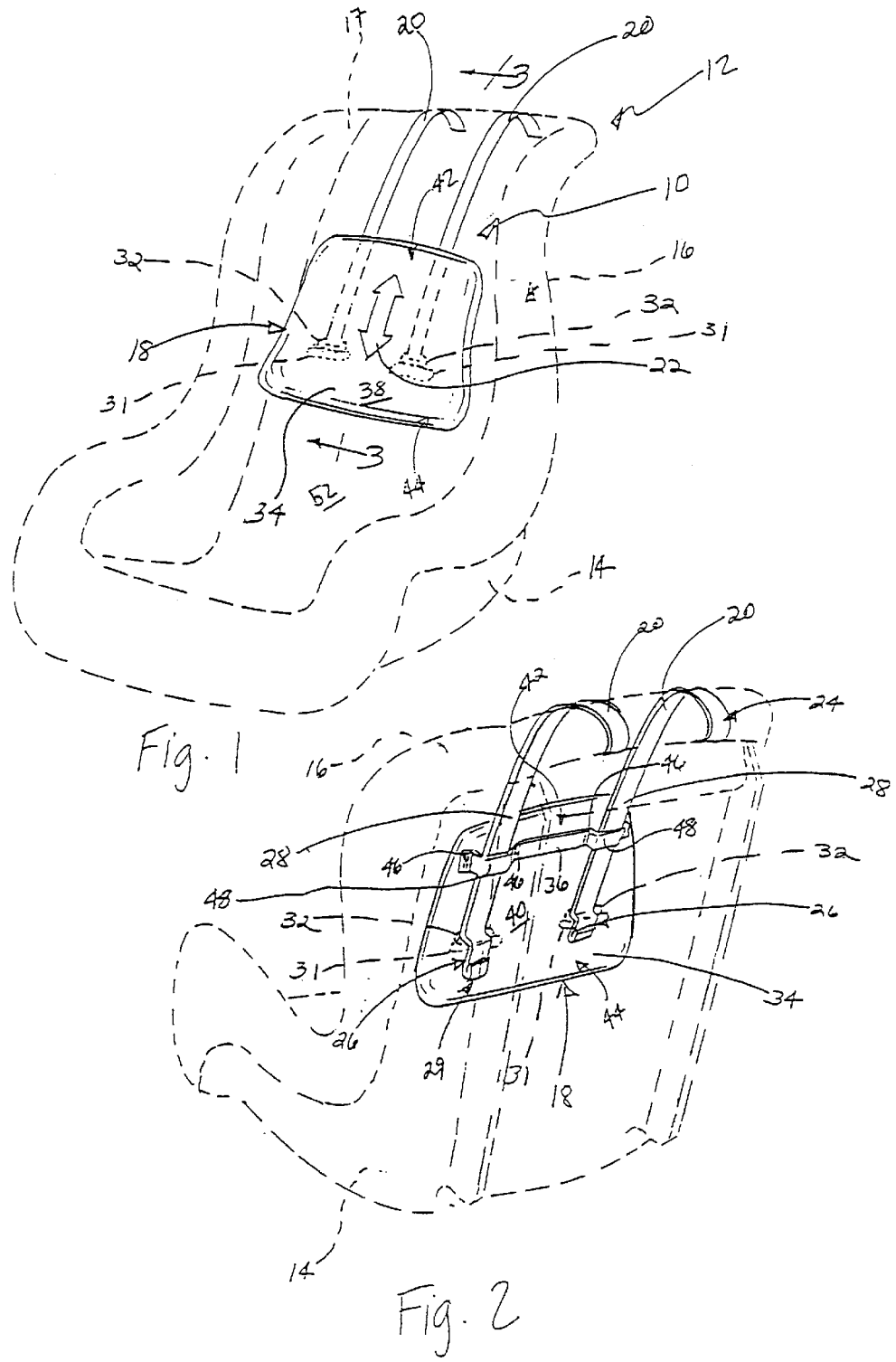
FIG. 1 is a front perspective view of an adjustable pillow system including two vertical slide straps and a pillow slidably coupled to the straps and showing the straps of the adjustable pillow system each having a top end coupled to a top portion of a juvenile vehicle seat cover (shown in phantom) which covers a juvenile vehicle seat shell (also shown in phantom) and a bottom end positioned to extend through a slot formed in the seat cover so that the pillow of the pillow system is movable in a generally vertical direction relative to the straps and vehicle seat cover.
FIG. 2 is a rear perspective view of the adjustable pillow system of FIG. 1 showing the pillow including a body and a horizontal positioning strap coupled to a back side of the body and showing a portion of each vertical slide strap positioned to lie between the horizontal positioning strap and the back side of the body of the pillow and also showing the bottom end of each vertical strap having a stitch-fold portion provided to prevent the vertical slide straps from pulling through the slot formed in the vehicle seat cover once the seat cover is coupled to the seat shell.

An adjustable pillow system 10 is provided for use with a juvenile vehicle seat 12 (shown in phantom in FIGS. 1 and 2). Juvenile vehicle seat 12 includes a seat shell 14 and a seat cover 16, also shown in phantom in FIGS. 1 and 2. Pillow system 10 includes a pillow 18 and a pair of vertical slide straps 20 which are coupled to seat cover 16. Pillow 18 is slidably coupled to vertical slide straps 20. Pillow system 10 is designed so that pillow 18 is movable in a generally vertical direction, as shown by arrow 22 in FIG. 1, along vertical slide straps 20. Pillow system 10 is provided for use with juveniles of varying heights and sizes. For instance, as a juvenile (not shown) grows, pillow 18 may be moved in an upward direction to accommodate the growing juvenile.

As mentioned above, adjustable pillow system 10 includes a pillow 18 and a pair of vertical slide straps 20.

Figure 3:
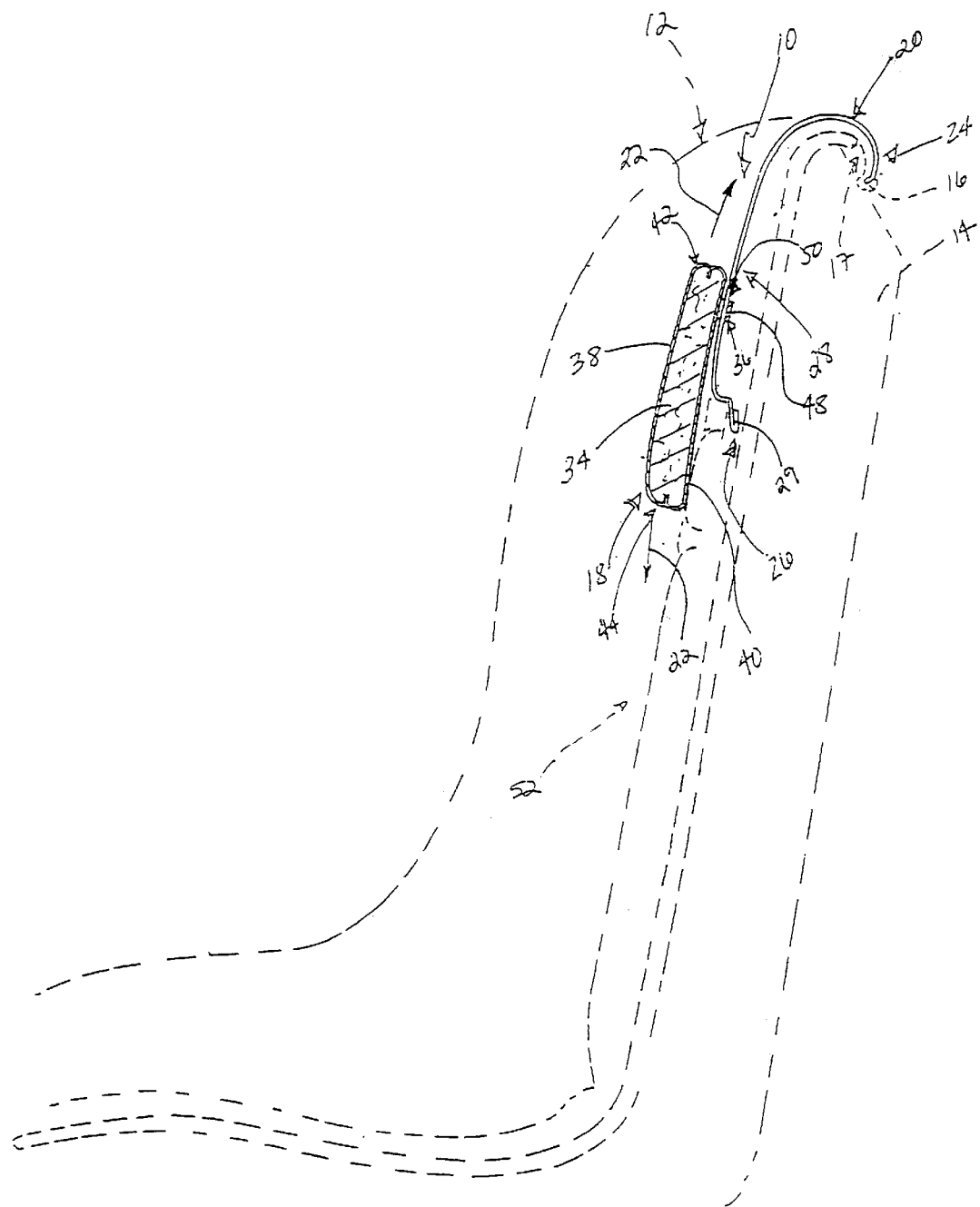
FIG. 3 is a sectional view taken along line 3—3 of FIG. 1 showing the generally vertical direction of movement of the pillow relative to the straps and the seat cover and showing the top end of one of the vertical slide straps coupled to the top portion of the seat cover and positioned to extend through a strap-receiving passageway formed between the horizontal positioning strap and the body of the pillow and also showing the strap positioned to extend through the slot formed in the seat cover.

Each vertical slide strap 20 includes a top end 24, a bottom end 26 and a middle portion 28 extending therebetween. As shown in FIGS. 2 and 3, top end 24 of each vertical slide strap 20 is coupled to a top portion 17 of seat cover 16 of juvenile vehicle seat 12. Bottom end 26 of each vertical slide strap 20 includes a stitch-fold portion 29, as shown in FIG. 2. Vertical slide straps 20 are positioned to lie in spaced-apart relation to each other.

Figure 4:
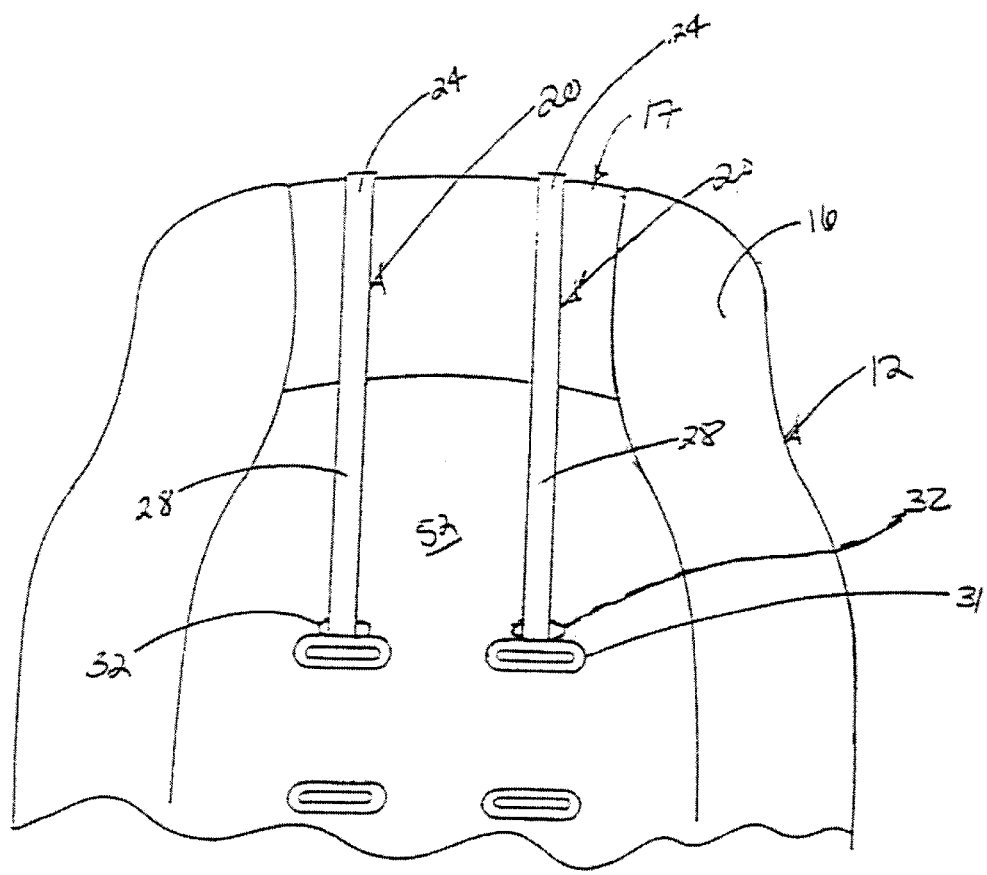
FIG. 4 is a front view of the vertical slide straps coupled to the seat cover and positioned to lie in spaced-apart relation to each other in order to extend through the slots of the seat cover and also showing each slot positioned to lie above a pair of harness-receiving slots of the seat cover provided for a harness-control system (not shown)

Seat cover 16 is formed to include two slots 32, shown in FIGS. 1, 2, and 4. Each slot 32 is formed to receive one vertical slide strap 20 therethrough. Seat shell 14 is also formed to include two apertures (not shown) positioned in alignment with slots 32 of seat cover 16 to receive vertical slide straps 20 therethrough as well. Stitch-fold portion 29 of each vertical slide strap 20 is provided to prevent vertical slide strap 20 from pulling through slot 32 formed in vehicle seat cover 16 and the corresponding aperture formed in seat shell 14. Slots 32 are positioned to lie above a pair of harness-receiving slots 31, as shown in FIG. 4, provided for use with a harness control system (not shown).

Figure 5:
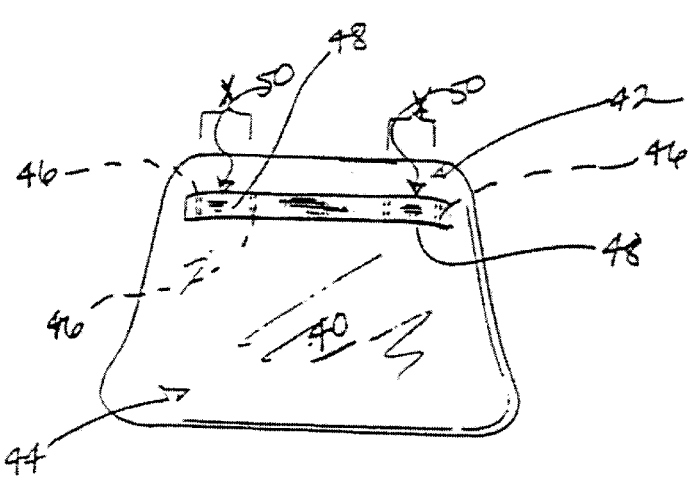
FIG. 5 is a rear view of the pillow of the present invention showing the pillow having a trapezoidal shape and also showing the horizontal positioning strap of the pillow coupled to a top portion of the body of the pillow by two sets of stitch points (shown by the dotted lines) to form the strap-receiving passageways.

Pillow 18 is formed to include a support portion or body 34 and a horizontal positioning strap 36 coupled to body 34 and shown, for example, in FIGS. 2 and 5. Body 34 includes a front side 38 and a back side 40 so that back side 40 is positioned to lie adjacent to seat cover 16, as shown in FIG. 3. Horizontal positioning strap 36 is coupled to back side 40 of body 34.

As shown in FIG. 5, body of pillow 34 is trapezoidal in shape and forms a top, narrow end 42 and a bottom, wide end 44. It is within the scope of the disclosure, however, to include an adjustable pillow system having a pillow of any shape and size. Horizontal positioning strap 36 is coupled to body 34 at top, narrow end 42 by two pairs of stitch points 46. As shown in FIG. 5, each pair of stitch points 46 is spaced-apart a distance "X" by a strap segment 48. Each strap segment 48 and back side 40 of body 34 of pillow 16 cooperate to define a strap-receiving passageway 50 formed to receive one vertical slide strap 20 therethrough, as shown in FIG. 3.

Figure 6:
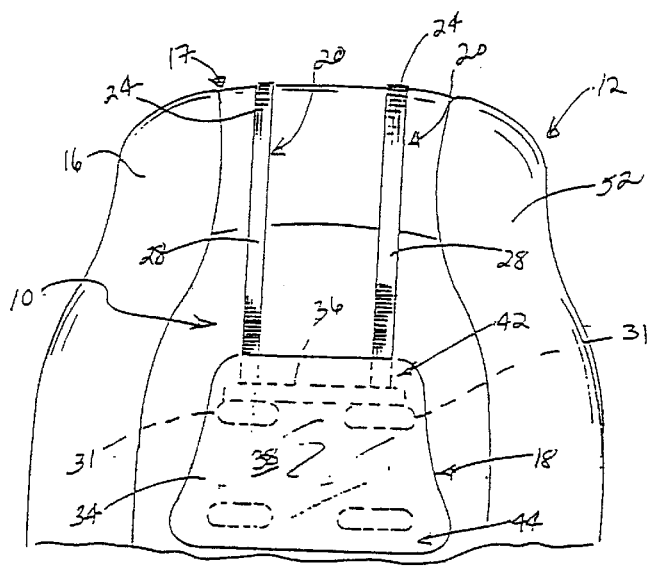
FIG. 6 is a front view of the adjustable pillow system of the present invention showing the pillow in a lowest position.
Figure 7:
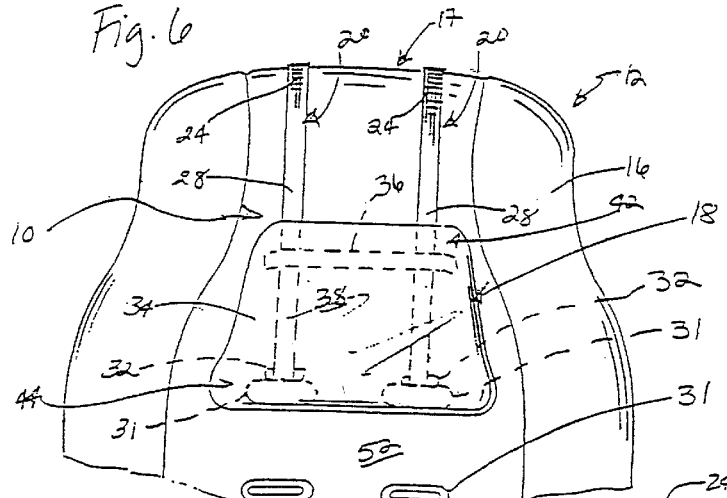
FIG. 7 is a front view similar to FIG. 6 showing the pillow in a middle position.
Figure 8:
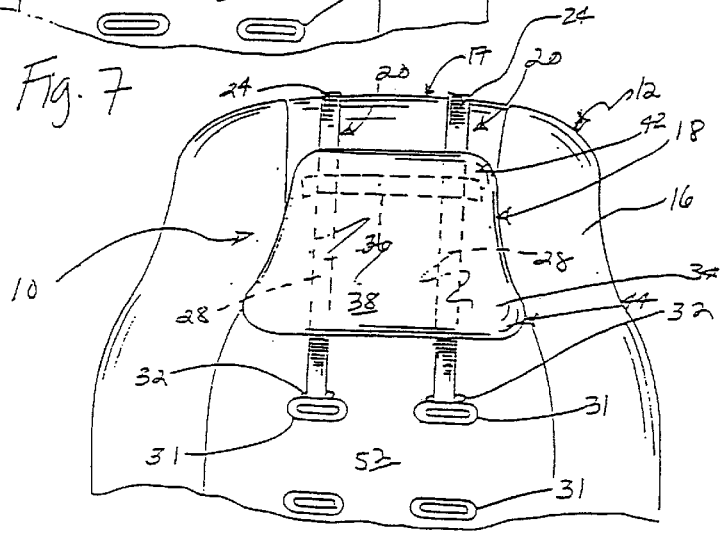
FIG. 8 is a front view similar to FIGS. 6 and 7 showing the pillow in a highest position.

Adjustable pillow system 10 is positioned to lie adjacent a front side 52 of seat cover 16 in order to face a juvenile (not shown) sitting in juvenile vehicle seat 12. Pillow 16 is movable up and down in a generally vertical direction along vertical slide straps 20, as shown by arrows 22 in FIGS. 1 and 3. Pillow 16 is movable along vertical slide straps 20 for use with juveniles of various heights. For example, FIG. 6 shows pillow 16 in a first, lowest position relative to seat cover 16 for use with a smaller and/or shorter juvenile, for instance. Pillow 16 is shown in a second middle position in FIG. 7 so that horizontal positioning strap 36 of pillow 16 is positioned to lie mid-way between top end 24 of each vertical slide strap 20 and slot 30 of seat shell 14. As shown in FIG. 8, pillow 16 is in a third, highest position relative to seat cover 16.

Pillow 16 moves along vertical slide straps 20 relative to seat cover 16. A user (not shown) is able to move pillow 16 along vertical slide straps 20 in order to position pillow 16 at an optimum height for the juvenile. Although three positions for the placement of pillow 16 along vertical slide straps 20 are shown in FIGS. 6–8, any number of positions are available between slots 30 of seat cover 16 and top end 24 of each vertical slide strap 20. Vertical side straps 20 may also be tightened or loosened by the user.

Once pillow 16 is positioned at the desired height along vertical slide straps 20, pillow 16 is held in that position due to frictional forces between horizontal positioning strap 36 and vertical slide straps 20. The frictional forces occur at each strap segment 48 of horizontal positioning strap 36. Horizontal positioning strap 36 and vertical slide straps 20 are made from a corrugated or webbed material. It is within the scope of the disclosure, however, to include a horizontal positioning strap and vertical slide straps made from any material. Other frictional forces which also act to hold pillow 16 stationary are those formed between back side 40 of body 34 of pillow 16 and front side 52 of seat cover 16. Body 34 of pillow 16 is made from a fleece material and front side 52 of seat cover 16 is made from a similar material although it is within the scope of the disclosure to include a body portion and seat cover made from any material.

Although this invention has been described in detail with reference to certain embodiments, variations and modifications exist within the scope and spirit of the invention as described and defined in the following claims.

What is claimed is:

1. An adjustable pillow system and seat cover combination for use with a juvenile vehicle seat, the combination comprising:

a vehicle seat cover coupled to the juvenile vehicle seat, a vertical slide strap having a top end coupled to the vehicle seat cover and a bottom end, a pillow slidably coupled to the vertical slide strap for generally vertical movement along the slide strap relative to the cover, and wherein the vehicle seat cover includes a slot and the bottom end of the vertical slide strap is received through the slot.

2. The combination of claim 1, wherein the vertical slide strap includes a middle portion positioned to lie between the bottom end and the top end, the bottom end of the vertical slide strap includes a stitch-fold portion, the cover includes a front side adjacent the pillow and a back side, and wherein the stitch-fold portion is positioned to lie adjacent the back side of the cover and the middle portion is positioned to lie adjacent the front side of the cover.

3. An adjustable pillow system is provided with a juvenile vehicle seat, the system comprising:

a support portion positioned to lie adjacent to the seat, a horizontal positioning strap coupled to the support portion and positioned to lie adjacent the seat, a pair of vertical slide straps coupled to the seat and the support portion and positioned to lie in spaced-apart relation to one another, the support portion being slidably movable in a generally vertical direction relative to the vertical slide straps, and wherein the seat includes two slots positioned to lie in space-apart relation to one another, and the vertical slide straps each include a top portion coupled to the seat, a middle portion positioned to lie adjacent to the seat, and bottom portion received through the respective slots of the seat.

4. The system of claim 3, wherein the bottom portion of each vertical slide strap includes a stitch-fold portion received through the respective slots of the seat to cause each vertical slide strap to remain stationary relative to the seat.

* * * * *